Nov. 15, 1927.
W. F. HEROLD
1,649,525
CASTER, SLIDE, AND THE LIKE
Filed Dec. 18, 1925
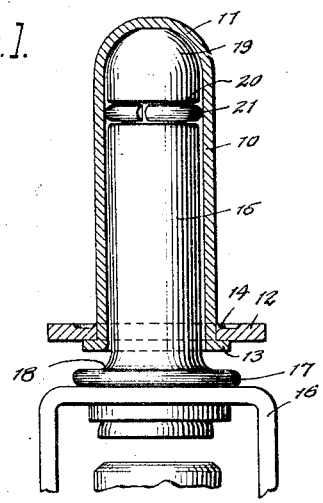
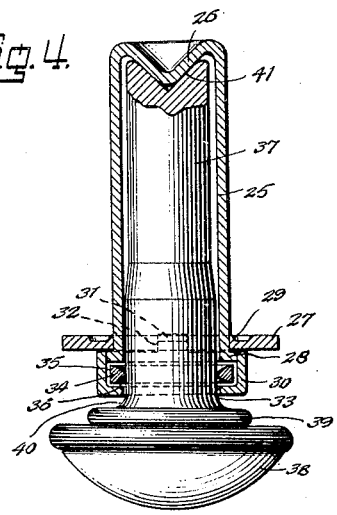
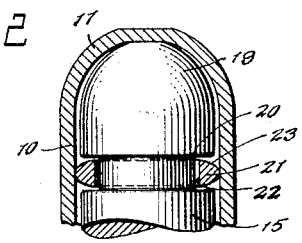
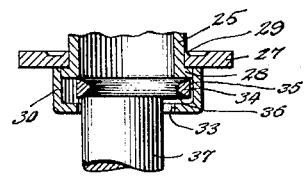
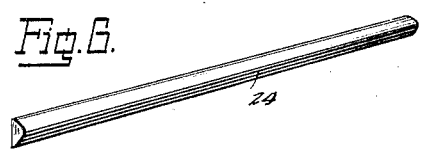
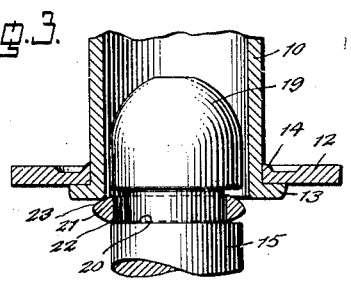
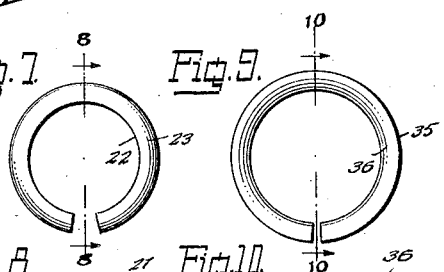
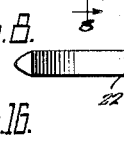
INVENTOR.
WALTER F. HEROLD.
BY
ATTORNEY.

Patented Nov. 15, 1927.

1,649,525

UNITED STATES PATENT OFFICE.

WALTER F. HEROLD, OF UPPER MONTCLAIR, NEW JERSEY, ASSIGNOR TO THE BASSICK COMPANY, OF BRIDGEPORT, CONNECTICUT, A CORPORATION OF CONNECTICUT.

CASTER, SLIDE, AND THE LIKE.

Application filed December 18, 1925. Serial No. 76,230.

The present invention relates to improvements in casters, slides, or the like, and particularly in spring holding means employed therein for the purpose of frictionally retaining the pintle in its socket or frame, an object of the invention being to provide such means which will permit insertion of the pintle in such socket or frame, without danger of distorting the spring means or forcing it out of position.

Heretofore such spring means have usually consisted of a split spring ring of circular cross-section, held either upon the caster pintle or in the socket or frame, and adapted to grip upon one or the other to retain the pintle against dropping out, at the same time permitting free rotation of the same. This ring was disposed loosely in a retaining recess, the manufacturing tolerances allowed in such devices causing it to project to variable degrees, and where it projected at any one point to an extent greater than half its thickness, the tendency when inserting the pintle in the socket frame was for the ring to be jammed against the retaining recess wall in such a way as to either distort it or force it out of the recess.

It is proposed in the present invention to provide a spring ring of novel form adapted to be self centering within its recess at any degree of projection within its inner and outer peripheral limits, so that a manufacturing tolerance substantially equal to the lateral thickness of the ring may be allowed, without danger of distorting or displacing the same. To this end, the present embodiment of the invention consists in providing a ring of such cross section that its projected surface forms a camming means acting in one direction between the inner and outer peripheral surfaces, as distinguished from the circular cross section ring which acts to cam both inwardly and outwardly, depending on which side of the center it is projected.

A further object of the invention is to provide a ring formed of solid drawn wire of non-circular cross section, adapted to be readily bent into ring shape, and at the same time maintaining a uniformity of cross section throughout its circumference, as distinguished from a ring formed from a metal band of flat metal, which upon being given a certain cross sectional shape will lose this shape to a great extent upon being bent into ring shape.

With the above and other objects in view, embodiments of the invention are shown in the accompanying drawings, and these embodiments will be hereinafter more fully described with reference thereto, and the invention will be finally pointed out in the claims.

In the drawings:

Fig. 1 is a vertical sectional view of a caster construction, provided with spring ring means, according to one embodiment of the invention;

Fig. 2 is an enlarged sectional view of the upper end thereof,

Fig. 3 is a similar view of the lower end of the socket, and showing the action upon insertion of the pintle;

Fig. 4 is a vertical sectional view of a modification;

Fig. 5 is a detail sectional view of the lower end of the socket, and showing the action upon insertion of the pintle;

Fig. 6 is a perspective view of a length of drawn wire, adapted for the formation of the spring ring of the invention;

Fig. 7 is a plan view of one form of spring ring;

Fig. 8 is a sectional view thereof, along the line 8—8 of Fig. 7;

Fig. 9 is a plan view of another form of spring ring;

Fig. 10 is a sectional view thereof, along the line 10—10 of Fig. 9; and

Figs. 11 to 16 are sectional views, showing various cross-sectional forms adapted to be employed.

Similar reference characters indicate corresponding parts throughout the several figures of the drawings.

Referring to the drawings, and more particularly to Figs. 1 to 3 thereof, the embodiment of the invention shown therein comprises a top bearing socket member 10 of cylindrical form, provided with an upper dome shaped thrust bearing end 11, and secured at its lower open end to a flange washer 12 by flanging over its end, as at 13, and pinching the metal of the washer against the surface of the socket member, as at 14. This type of socket is adapted to be secured in suitable holding means in a furniture leg, or the like, but the invention contemplates any form of socket, spring frame, or other pintle holding means within which the pintle is adapted to be removably inserted.

The pintle 15, shown in Fig. 1 as secured at its lower end to a caster horn 16, may also be provided upon a slide, or other type of floor engaging element, and is provided at its lower end with a base flange 17 having a fillet surface 18 between it and the cylindrical pintle surface, while at the upper end there is provided a rounded bearing surface 19 adapted to have thrust bearing rotatable contact against the upper end of the socket. The pintle is of such diameter as to have free rotary movement in the socket, and for the purpose of frictionally retaining it, at the same time permitting easy insertion and removal, an annular recess or pocket 20 is provided in the cylindrical surface of the pintle within which there is loosely and rotatably engaged a split spring ring 21, which in its expanded position has an outer diameter greater than that of the bore of the socket, and in its compressed socket engaging position has an inner diameter greater than that of the inner wall of the recess 20, so that in this latter position it frictionally engages the socket, but permits free rotation of the pintle.

The cross-section of the ring is such that the inner peripheral surface 22 is substantially cylindrical, while the outer surface 23 is tapered from the upper and lower edges of the surface 22 to the projected outer socket engaging periphery, so that at any degree of projection, within the peripheral limits of the ring, the surface presented is such that a force exerted against it will tend to press the ring into its recess and center it. Thus as shown in Fig. 3, illustrating the manner of inserting the pintle in the socket, the ring is projected at one side to an extent just short of its thickness, but in contacting with the lower edge of the socket through upward pressure of the pintle is adapted to be positively cammed back into the recess, and thereby accurately centered and compressed without distortion or any tendency to be forced out of its recess. It is obvious that with a circular cross-section ring projected more than half its thickness the action would be to distort and force it out of the recess, and if pressed into the socket with sufficient force to jam it between the socket and pintle surfaces, impairing the free rotary action of the pintle and making its removal from the socket difficult.

As shown in Figs. 6, 7 and 8, the ring is adapted to be formed from a length of drawn wire 24, of the desired cross-section, and when bent into circular form will maintain the cross-sectional shape uniformly at all points.

In Figs. 4, 5, 9 and 10 there is illustrated a modified construction, in which the split spring ring is carried by the socket member and is adapted to grip upon the pintle, rotating with it freely within the socket. The embodiment shown consists of a cylindrical socket 25 having an inverted cone-shaped thrust bearing upper end portion 26, and secured at its lower open end to a flange washer 27 by flanging over its end, as at 28, and pinching the metal of the washer against the surface of the socket member, as at 29. A cup member 30 is secured at the lower end of the socket, as by lugs or ears 31 inserted through slots 32 pierced in the washer and bent over upon its upper surface, and is provided with a pintle receiving aperture 33 in axial line with the bore of the socket. Within the cup member there is loosely and rotatably retained the split spring ring 34, reversely formed with respect to the ring of the first embodiment, that is, with its outer surface 35 of cylindrical form and its inner surface 36 tapering from the upper and lower edges of the surface 35, the outer diameter of this ring in its expanded pintle retaining relation, as shown in Fig. 4, being less than the inner diameter of the cup member, so that the ring is freely rotatable therein, while its inner diameter in contracted relation, as shown in Fig. 5, is less than that of the portion of the pintle adapted to be gripped thereby.

The pintle 37 is shown in this instance as secured to a floor engaging slide 38, being provided adjacent the slide with a flanged base portion 39 connected to the cylindrical pintle surface by a fillet surface 40, and having an inverted cone-shaped bearing recess 41 at its upper end adapted to have a rotatable thrust bearing engagement with the bearing end 26 of the socket member. The upper entering portion of the pintle is of reduced diameter, while its lower portion 42 is of larger diameter and is adapted to expand and be gripped by the ring, being of smaller diameter than the bore of the socket member, however, to permit of its free rotation therein.

The operation of the ring is substantially the same as in the first described embodiment, the engagement of the pintle end, Fig. 5, with any point of its projected surface, between the inner and outer peripheral limits, adapted to cam the ring to a centralized position within the retaining cup, without possibility of distortion or forcing the ring out of the cup.

In Figs. 11 to 16 there are illustrated examples of several cross-sectional shapes that may be employed. Obviously other shapes designed for the same purpose may also be employed, and the camming surface may be only at one side, if desired, that is, in the embodiment shown in Figs. 1 to 3 it may be at the upper side, as in Fig. 15, while in the other illustrated embodiment it may be at the lower side, as in Fig. 16, the cross section of these forms being substantially quarter round, or right angle triangle shape.

I have illustrated and described preferred and satisfactory embodiments of the invention, but it will be obvious that changes may be made therein, within the spirit and scope thereof, as defined in the appended claims.

Having thus described my invention, what I claim and desire to secure by Letters Patent is:—

1. Retaining means for the pintle of a caster or the like, including a pintle receiving element and a floor engaging element having a pintle adapted to be engaged in said pintle receiving element, comprising a spring ring of non-circular cross-section adapted to be carried by one of said elements and to grip the other along a circumferential periphery, said ring having an annular camming surface inclined with relation to said peripheral gripping surface and a peripheral surface opposed to said gripping surface and non-parallel thereto.

2. Retaining means for the pintle of a caster or the like, including a pintle receiving element and a floor engaging element having a pintle adapted to be engaged in said pintle receiving element, comprising a spring ring carried by one of said elements adapted to grip the other, said ring having a maximum thickness periphery, a reduced thickness gripping periphery, and upper and lower converging surfaces extending from the upper and lower edges of said maximum thickness periphery to said reduced thickness periphery.

3. Retaining means for the pintle of a caster or the like, including a pintle receiving element and a floor engaging element, one of said elements having an annular ring retaining recess including a lateral abutment surface, comprising a spring ring of non-circular cross-section engaged in said recess and adapted to grip the other element along a circumferential periphery, said ring having an annular camming surface inclined with relation to said periphery.

4. Retaining means for the pintle of a caster or the like, including a pintle receiving element and a floor engaging element having a pintle adapted to be engaged in said pintle receiving element, comprising a spring ring carried by one of said elements adapted to grip the other along a circumferential periphery, said ring being bent from solid drawn wire of non-circular cross-section whereby a uniform cross-sectional shape is maintained at all points of its circumference, and having a camming surface inclined with relation to said periphery.

5. Retaining means for the pintle of a caster or the like, including a pintle-receiving element and a floor-engaging element having a pintle adapted to be engaged in said pintle-receiving element, comprising a spring ring of non-circular cross-section adapted to be carried by one of said elements and to grip the other along a circumferential periphery, said ring having an annular camming surface inclined with relation to said periphery.

6. Retaining means for the pintle of a caster or the like, including a pintle-receiving element and a floor-engaging element having a pintle adapted to be engaged in said pintle-receiving element, comprising a spring ring of non-circular cross-section adapted to be carried by one of said elements and to grip the other along a circumferential periphery, said ring having an annular camming surface inclined with relation to said peripheral gripping surface and a cylindrical peripheral surface opposed to said gripping surface.

Signed at Newark, in the county of Essex, and State of New Jersey, this 27th day of November, 1925.

WALTER F. HEROLD.